United States Patent
Haetty

(10) Patent No.: US 11,875,112 B2
(45) Date of Patent: Jan. 16, 2024

(54) METHOD AND DEVICE FOR ANALYZING ELEMENTS OF A TEXT COLLECTION, METHOD AND DEVICE FOR SEARCHING FOR INFORMATION IN DIGITAL DATA

(71) Applicant: Robert Bosch GmbH, Stuttgart (DE)

(72) Inventor: Anna Constanze Haetty, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 304 days.

(21) Appl. No.: 17/434,629

(22) PCT Filed: Mar. 25, 2020

(86) PCT No.: PCT/EP2020/058253
§ 371 (c)(1),
(2) Date: Aug. 27, 2021

(87) PCT Pub. No.: WO2020/193591
PCT Pub. Date: Oct. 1, 2020

(65) Prior Publication Data
US 2022/0180062 A1    Jun. 9, 2022

(30) Foreign Application Priority Data

Mar. 27, 2019   (DE) .................... 10 2019 204 222.8
Oct. 2, 2019    (DE) .................... 10 2019 215 270.8

(51) Int. Cl.
G06F 40/279    (2020.01)
G06F 16/903    (2019.01)
G06F 40/30     (2020.01)

(52) U.S. Cl.
CPC ...... *G06F 40/279* (2020.01); *G06F 16/90335* (2019.01); *G06F 40/30* (2020.01)

(58) Field of Classification Search
CPC ... G06F 40/279; G06F 40/30; G06F 16/90335
See application file for complete search history.

(56) References Cited

U.S. PATENT DOCUMENTS

2014/0181124 A1* 6/2014 Hofmeier ............... G06F 16/93
  707/749
2018/0052849 A1* 2/2018 Jagmohan ............. G06N 20/00

FOREIGN PATENT DOCUMENTS

JP    2018045658 A    3/2018

OTHER PUBLICATIONS

Camacho-Collados and Pilehvar: "From Word to Sense Embeddings: A Survey on Vector Representations of Meaning", J. of Artificial Intelligence Reserach 63 (2018): 743-788.
Lin and Lu: "Neural Adaptation Layers for Cross-domain Named Entity Recognition", EMNLP 2018 paper, Conference of Empirical Methods in Natural Language Processing, (2018), arXiv: 1810.06368, pp. 1-12.

(Continued)

*Primary Examiner* — Ibrahim Siddo
(74) *Attorney, Agent, or Firm* — NORTON ROSE FULBRIGHT US LLP; Gerard A. Messina

(57) ABSTRACT

Methods for analyzing elements of a first text collection, and devices and methods for searching for information in a set of digital data, in particular in a computer network.

15 Claims, 3 Drawing Sheets

(56) References Cited

OTHER PUBLICATIONS

Luong, et al.: "Ontology Learning Through Focused Crawling and InformationEextraction", 2009 International Conference on Knowledge and Systems Engineering, IEEE 2009, pp. 106-112.
Muromägi, et al.: "Linear Ensembles of Word Embedding Models" (2017), arXiv: 1704.01419, pp. 1-10.
Elizabeth Liddy, "How a Search Engine Works" Aug. 5, 2008, pp. 1-5, Retrieved from the Internet on Nov. 8, 2016: http://web.archive.org/web/20080805203826/http://www.infotoday.com/searcher/may01/liddy.htm. 5 Pages.
Anonymous. "Web crawler—Wikipedia, the free encyclopedia" Jul. 4, 2011, Retrieved from the Internet on Feb. 2, 2015: http://wikipedia.org/w/index.php?title=Web_crawler&oldid=437693811. 16 pages.
Mikolov et al., 2013, "Distributed representations of words and phrases and their compositionality," Advances in Neural Information Processing Systems 26 (NIPS 2013), Retrieved from the Internet on Aug. 26, 2021: https://papers.nips.cc/paper/2013/file/9aa42b31882ec039965f3c4923ce901b-Paper.pdf. 9 Pages.
P. Bojanowski, E. Grave, A. Joulin, T. Mikolov, 2012, "Enriching Word Vectors with Subword Information" arXiv:1607.04606v2. Retrieved from the Internet on Aug. 26, 2021: https://arxiv.org/abs/1607.04606. 12 Pages.
International Search Report for PCT/EP2020/058253 dated May 12, 2020.

\* cited by examiner

METHOD AND DEVICE FOR ANALYZING ELEMENTS OF A TEXT COLLECTION, METHOD AND DEVICE FOR SEARCHING FOR INFORMATION IN DIGITAL DATA

FIELD

The present invention relates to a method for analyzing elements of a first text collection.

The present invention relates to a device for analyzing elements of a first text collection.

Moreover, the present invention relates to methods and devices for searching for information in digital data.

BACKGROUND INFORMATION

Machine-based, in particular computer-implemented, systems for text analysis use rule-based and/or statistical methods for terminology extraction and subject indexing. Hybrid methods and machine learning methods are likewise used for text analysis.

Terminology extraction finds its application, among other areas, in lexicon, thesaurus, and ontology development, the information search in databases, in text classification, and in text clustering. A traditional problem in term extraction is the classification of ambiguous terms, so-called sub-technical terms. These terms lie between technical terminology and general language. For example, the German word "Absperren" has an everyday meaning of "to lock something," and a specialized meaning in handicrafts, namely, "sealing of surfaces." The type of change in meaning may be different, from homonymy (completely different meanings), to polysemy (meanings still have similarity), to a narrowing of meaning in technical terminology.

SUMMARY

Preferred specific embodiments of the present invention relate to a method for analyzing elements of a first text collection ("corpus"), including the following steps: providing the first text collection, providing a second text collection that is different from the first text collection, ascertaining a first vector space model that characterizes a first vector space associated with the first text collection, ascertaining a second vector space model that characterizes a second vector space associated with the second text collection, ascertaining a modified second vector space model as a function of a mapping of the second vector space onto the first vector space, analyzing at least one element of the first text collection as a function of a first word vector of the first vector space model corresponding to the at least one element, and as a function of a second word vector of the modified second vector space model corresponding to the at least one element. Information concerning a meaning or a shift in meaning of the at least one element, for example a term or word, of the first text collection may thus be advantageously ascertained in an efficient manner.

In further preferred specific embodiments of the present invention, it is provided that a Word2Vec continuous bag of words (CBOW) model according to Tomas Mikolov et al., 2013, "Distributed representations of words and phrases and their compositionality," Advances in Neural Information Processing Systems, pages 3111-3119, Curran Associates, Inc., is used to form the first and/or second vector space model. For example, the word vectors thus obtained may have approximately 200 dimensions. The vector space model thus allows words of a text collection to be represented by corresponding vectors of the stated vector space. The similarity of the vectors represents the similarity in meaning. The first vector space and the second vector space particularly preferably have the same number of dimensions.

In further preferred specific embodiments, it is provided that a fast text model according to Bojanowski et al. is used to form the first and/or second vector space model(s); cf., for example, P. Bojanowski*, E. Grave*, A. Joulin, T. Mikolov, 2012, "Enriching Word Vectors with Subword Information."

In further preferred specific embodiments of the present invention it is provided that ascertaining the modified second vector space model as a function of a mapping of the second vector space onto the first vector space is carried out by solving the orthogonal Procrustes problem (according to Schönemann, 1964). An optimal matrix W* may be computed for matrices A, B, matrices A, B corresponding to the first vector space and the second vector space, for example. Optimal matrix W* minimizes the sum of the quadratic Euclidian distances between Bs mapping onto Bi*W and Aj* for dictionary entries $D_{i,j}$ $$W^* = \underset{W}{\mathrm{argmin}} \Sigma_i \Sigma_j D_{i,j} \|B_{i*} W - A_{j*}\|^2,$$

where D is a representation of the dictionary as a binary matrix, so that $D_{i,j}=1$ if $w_i \in V_b$. In further preferred specific embodiments, this may be solved by applying the singular value decomposition: $W^*=UV^T$, where $B^T DA=U\Sigma V^T$, and B may then be mapped onto/aligned with A as follows: $B=AW^*$. In this way, the word vectors of the two vector spaces are advantageously comparable.

In further preferred specific embodiments of the present invention, it is provided that the analysis includes ascertaining a first variable that characterizes a vector distance between the first word vector and the second word vector, in particular the first variable representing a shift in meaning of the at least one element from a second text collection that represents general language, to a domain associated with the first text collection, for example a technical terminology. The stated vector distance or the first variable advantageously characterizes the shift in meaning, in particular a measure for the shift in meaning, i.e., a quantitative statement concerning the degree of the shift in meaning, also being possible. An even more accurate analysis of elements of the first text collection, for example, may thus take place.

In further preferred specific embodiments of the present invention, it is provided that the analysis includes the formation of a cosine distance or a Euclidian distance between the first word vector and the second word vector.

In further preferred specific embodiments of the present invention, it is provided that the first text collection or the first corpus is a theme-specific and/or subject-specific text collection, the second text collection or corpus being a non-theme-specific and/or non-subject-specific text collection, in particular a general language text collection.

A subject-specific corpus contains, for example, only text that is specific for a domain. A general language corpus refers to text or a collection of texts without a specific association with a domain. All texts of a cooking forum on the Internet represent a subject-specific corpus, for example. All entries in Wikipedia represent a general language corpus, for example.

In further preferred specific embodiments of the present invention, it is provided that the provision of the first text collection and/or the provision of the second text collection include(s): a) collecting texts and/or words in a computer or computer network and/or a database, in particular with the aid of crawling of websites, for example focused crawling, and/or b) collecting texts and/or words from digital or digitized books.

In further preferred specific embodiments of the present invention, it is provided that word vectors of elements of the text collections that occur in only one of the two text collections are discarded. The memory requirements may be reduced in this way.

In further preferred specific embodiments of the present invention, it is provided that the at least one element of the first text collection is ascertained with the aid of a term extraction method. In further preferred specific embodiments, it is also possible to ascertain, for example with the aid of the stated term extraction method, multiple elements of the first text collection that are analyzed, for example, with regard to a possible shift in meaning, for example according to further preferred specific embodiments. In further preferred specific embodiments, it is provided that the method further includes: introducing a portion of the first text collection into the second text collection and/or vice versa. The introduction of the portion of the first text collection into the second text collection and/or vice versa may take place, for example, after or during the provision of the second text collection. In further preferred specific embodiments, the introduction is equivalent to mixing a portion of the first text collection with the second text collection. In further preferred specific embodiments of the present invention, the introduction or mixing may have the following effect: the more domain-specific the technical terms/terms are, the more limited is the context in which they occur (for example, the word "blanch" as a cooking method usually occurs together with "salt water," while "cookies" appears in baking recipes as well as in other contexts, for example with regard to Christmas). Thus, according to further preferred specific embodiments, when word vectors are now formed on each text collection (for example, general language and domain-specific), the word vectors from very domain-specific terms may then be comparatively similar, since only the texts from the domain-specific corpus that are still very similar to one another occur in the general language corpus (text collection). For the general language terms or ambiguous terms the contexts are more diverse, as a result of which according to further preferred specific embodiments, the vectors diverge more greatly from one another.

Further preferred specific embodiments of the present invention relate to a use of the method according to the specific embodiments for ascertaining a shift in meaning of at least one element of the first text collection from a second text collection, representing general language, to a domain associated with the first text collection, for example a technical terminology, in particular for ascertaining an intensity of the shift in meaning of the at least one element of the first text collection from the second text collection to the domain associated with the first text collection.

In further preferred specific embodiments of the present invention, it is provided that the method further includes: ascertaining a bias vector, in particular for term extraction methods, as a function of the shift in meaning. This advantageously allows a precise initialization of the bias vector, it being possible to speed up the convergence of the algorithm. According to further preferred specific embodiments, the bias vector may also be referred to as a "teleportation vector" or "personalization vector."

In further preferred specific embodiments of the present invention, it is provided that the method further includes: ascertaining an instantaneous page rank value as a function of the shift in meaning, in particular as a function of the bias vector.

One option for also finding terminology for a certain field in a heterogeneous text data collection is to use the Personalized PageRank algorithm. The nodes in the graph are represented by the words in the text, and the edges are represented by their joint occurrence within a window or their word vector similarity, etc. (Milhacea and Tarau, 2004; De Groc et al., 2011; Khan et al., 2016, Zhang et al., 2017, among others). The PageRank algorithm may be formalized as follows:

$$PR'=d*A*PR+(1-d)*v,$$

where PR is a vector having absolute value |V|, in which each value is associated with a word, PR' is the instantaneous page rank and PR is the page rank from the preceding step, d is an attenuation factor, A is the transition matrix, and v is the above-mentioned bias vector, which for each node (each word) contains a value that determines how greatly the computation is to be influenced in the direction of a node.

Consequently, for the term extraction it may be useful according to further preferred specific embodiments to influence the computation in the direction of several seed terms: $v_i=1$ if word $w_i$ in question is contained in the set of seed words; otherwise, $v_i=0$.

In further preferred specific embodiments of the present invention, stated bias vector $v_i$ may be ascertained as a function of the shift in meaning that is ascertained according to preferred specific embodiments, which allows an accurate computation of the bias values and speeds up the convergence of the algorithm.

In further preferred specific embodiments of the present invention, stated bias vector $v_i$ may be ascertained as follows, for example: $v_i=1-x_i$, if $x_i$ is the shift in meaning associated with a word $w_i$ ("meaning shift value"); otherwise, $v_i=0$.

Further preferred specific embodiments of the present invention relate to a device for analyzing elements of a first text collection, the device being designed to carry out the following steps: providing the first text collection, providing a second text collection that is different from the first text collection, ascertaining a first vector space model that characterizes a first vector space associated with the first text collection, ascertaining a second vector space model that characterizes a second vector space associated with the second text collection, ascertaining a modified second vector space model as a function of a mapping of the second vector space onto the first vector space, analyzing at least one element of the first text collection as a function of a first word vector of the first vector space model corresponding to the at least one element, and as a function of a second word vector of the modified second vector space model corresponding to the at least one element.

In further preferred specific embodiments of the present invention, it is provided that the device is designed to carry out the method according to the specific embodiments of the present invention.

In further preferred specific embodiments of the present invention, the device includes at least one computer, and at least one memory device associated with the computer for at least temporarily storing a computer program, the computer program being designed in particular for controlling an operation of the device, in particular for carrying out the method according to preferred specific embodiments. In further preferred specific embodiments, the computer includes at least one of the following elements: a microprocessor, a microcontroller, a digital signal processor (DSP), a programmable logic module (a field programmable gate array (FPGA), for example), an application-specific integrated circuit (ASIC), and a hardware circuit. Combinations thereof are also possible in further preferred specific embodiments, as well as a distributed arrangement of at least some components, for example on various elements of a computer network. In further preferred specific embodiments, the memory device includes at least one of the following elements: a volatile memory, in particular a working memory (RAM), and a nonvolatile memory, in particular a flash EEPROM. The computer program is preferably stored in the nonvolatile memory. In further preferred specific embodiments, data that are usable for carrying out the method according to the specific embodiments are also at least temporarily storable in the memory device. The data may include at least one of the following elements, for example: the first text collection or portions of the first text collection, the second text collection or portions of the second text collection, data characterizing the first vector space model and/or the second vector space model and/or the modified second vector space model, data characterizing the mapping of the second vector space onto the first vector space, in particular in the form of a transformation matrix, data characterizing one or multiple word vectors of the first vector space and/or of the second vector space, the first variable, and/or shifts in meaning ascertained according to further preferred specific embodiments, in particular in the form of numerical values.

Further preferred specific embodiments of the present invention relate to a method for searching for information in a set of digital data, in particular in a computer and/or computer network, including the following steps: providing seed information that characterizes one or multiple starting points in the set of digital data, in particular in the computer network, for the search for information, searching for information in the computer network as a function of the seed information, a method according to the specific embodiments of the present invention being used for providing the seed information. In this way, particularly meaningful seed information, for example that is specific or unambiguous for a certain domain, may be predefined which increases the efficiency of the search. It is thus possible, using the same computer resources, to search for or evaluate a fairly large set of digital data, and crawling may be carried out for theme-relevant data, in particular text data, using less computing time than with conventional approaches. In particular, in further preferred specific embodiments the above-described search method may be used for implementing efficient focus crawlers.

In further preferred specific embodiments of the present invention, the seed information may be, for example, Internet addresses (URLs) and/or search words for use with at least one search engine and/or database.

In further preferred specific embodiments of the present invention, it is provided that the provision of the seed information includes: predefining a first number of terms for the search (for example, by a user via a user interface and/or automatedly, as a function of configuration data, for example), ascertaining a shift in meaning of the first number of terms for the search as a function of the first variable, using those terms of the first number of terms whose shift in meaning falls below a predefinable first threshold value as seed information for the search. It is thus advantageously ensured that particularly specific terms are used for the seed information.

Further preferred specific embodiments of the present invention relate to a method for searching for information in a set of digital data, in particular in a computer and/or computer network or a database, including the following steps: receiving a search term, assessing the search term as a function of a shift in meaning of the search term, in particular with respect to the second text collection, ascertained with the aid of the method according to the specific embodiments, and as a function of the assessment, carrying out the search using the search term or rejecting the search term. It is thus advantageously possible to carry out searches in a targeted manner when sufficiently accurate or specific search terms, in particular with regard to a certain domain, are used, whereas search operations for less specific search terms may be avoided, which saves computer resources and energy.

Further features, application options, and advantages of the present invention result from the description below of exemplary embodiments of the present invention, illustrated in the figures. All described or illustrated features, alone or in any arbitrary combination, constitute the subject matter of the present invention, regardless of their wording or illustration in the description or figures, respectively.

DETAILED DESCRIPTION OF EXAMPLE EMBODIMENTS

Figure 1:
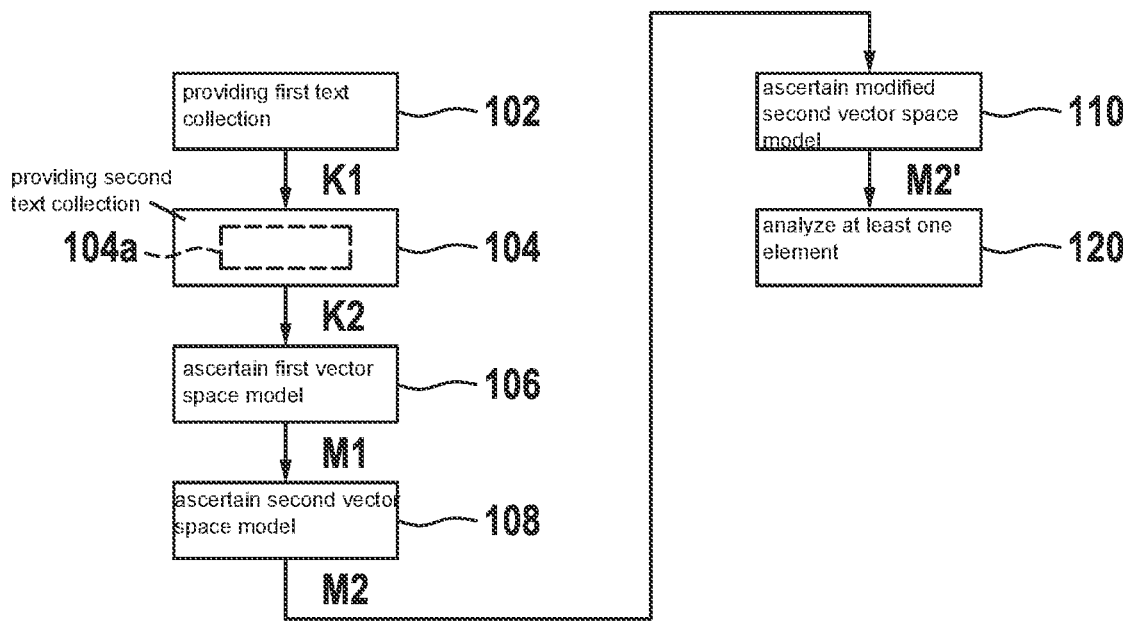
FIG. 1 schematically shows a simplified flowchart of a method according to preferred specific embodiments of the present invention.

FIG. 1 schematically shows a simplified flowchart of a method according to preferred specific embodiments. The method is usable for analyzing elements E of a first text collection ("corpus") K1 (cf. also the block diagram from FIG. 2), and includes the following steps: providing 102 (FIG. 1) first text collection K1 (FIG. 2), providing 104 (FIG. 1) a second text collection K2 that is different from first text collection K1, ascertaining 106 a first vector space model M1 that characterizes a first vector space associated with first text collection K1, ascertaining 108 a second vector space model M2 that characterizes a second vector space associated with second text collection K2, ascertaining 110 a modified second vector space model M2' as a function of a mapping of the second vector space onto the first vector space, for example with the aid of a transformation matrix T, analyzing 120 at least one element E of first text collection K1 as a function of a first word vector WV1 of first vector space model M1 corresponding to the at least one element E, and as a function of a second word vector WV2 of modified second vector space model M2' corresponding to the at least one element E. Analysis 120 is also indicated by block arrow A2 in FIG. 2. Information concerning a meaning or a shift in meaning BV of the at least one element E, for example a term or word, of first text collection K1 may thus be advantageously ascertained in an efficient manner.

In further preferred specific embodiments, it is also possible to select a different order of steps 102, 104, 106, 108, for example: 102, 106, 104, 108, etc.

In further preferred specific embodiments, it is provided that a Word2Vec CBOW model according to Tomas Mikolov et al., 2013, "Distributed representations of words and phrases and their compositionality," Advances in Neural Information Processing Systems, pages 3111-3119, Curran Associates, Inc., is used to form first and/or second vector space model(s) M1, M2. For example, word vectors WV1, WV2, . . . thus obtained may have approximately 200 dimensions. The first vector space and the second vector space particularly preferably have the same number of dimensions.

In further preferred specific embodiments, it is provided that a fast text model according to Bojanowski et al. is used to form the first and/or second vector space model(s); cf., for example, P. Bojanowski*, E. Grave*, A. Joulin, T. Mikolov, 2012, "Enriching Word Vectors with Subword Information." In further preferred specific embodiments, it is provided that analysis 120 (FIG. 1) includes ascertaining a first variable G1 (FIG. 2) that characterizes a vector distance between first word vector WV1 and second word vector WV2, in particular first variable G1 representing a shift in meaning BV of the at least one element E from a second text collection K2 that represents the general language, to a domain associated with first text collection K1, for example a technical terminology. The stated vector distance or first variable G1 advantageously characterizes shift in meaning BV, in particular a measure for shift in meaning BV, i.e., a quantitative statement concerning the degree of shift in meaning BV, also being possible.

In further preferred specific embodiments, it is provided that analysis 120 includes the formation of a cosine distance or a Euclidian distance or some other distance between first word vector WV1 and second word vector WV2.

In further preferred specific embodiments, the following is provided: forming an intersecting set of neighboring words for a target word in both text collections. The smaller the shift in meaning, the smaller also is the intersecting set.

In further preferred specific embodiments, it is provided that first text collection K1 is a theme-specific and/or subject-specific text collection, second text collection K2 being a non-theme-specific and/or non-subject-specific text collection, in particular a general language text collection.

In further preferred specific embodiments, it is provided that provision 102 (FIG. 1) of first text collection K1 and/or provision 104 of second text collection K2 include(s): a) collecting texts and/or words in a computer network and/or a database, in particular with the aid of crawling of websites, for example focused crawling, and/or b) collecting texts and/or words from digital or digitized books.

In further preferred specific embodiments, a technical-language text collection K1 may be formed, for example, by the targeted collection of multiple technical texts from one or multiple sources, for example databases and/or private and/or public computer networks (the Internet, for example), for example theme-specific websites, reference books, technical publications.

In further preferred specific embodiments, a general language text collection K2 may be formed, for example, by the random collection of multiple texts from one or multiple sources, for example databases (newspaper texts, for example) and/or private and/or public computer networks (the Internet, for example).

In further preferred specific embodiments, it is provided that word vectors of those elements of text collections K1, K2 that occur in only one of the two text collections are discarded. The memory requirements may be reduced in this way. In further preferred specific embodiments, this may take place, for example, in step 120 of analysis or also prior to same.

In further preferred specific embodiments, it is provided that the at least one element E of first text collection K1 is ascertained with the aid of a term extraction method TE. In further preferred specific embodiments, it is also possible to ascertain, for example with the aid of stated term extraction method TE, multiple elements E of first text collection K1 (all technical expressions, for example) that are analyzed, for example, with regard to a possible shift in meaning, for example according to further preferred specific embodiments.

In further preferred specific embodiments, first variable G1 or shift in meaning BV may be ascertained for a (further) element of first text collection K1, for example with the aid of the following steps, provided that models M1, M2' are already present (for example, by carrying out steps 102, 104, 106, 108, 110 beforehand): selecting or predefining further element E, ascertaining first variable G1 as a function of the word vectors of both models M1, M2' that are associated with further element E. This means that in further preferred specific embodiments, steps 102, 104, 106, 108, 110 do not have to be repeated for each ascertainment of variables G1, BV for a (further) element E. Rather, in further preferred specific embodiments it is sufficient to ascertain the word vectors associated with further element E and to evaluate their distance, for example.

Figure 2:
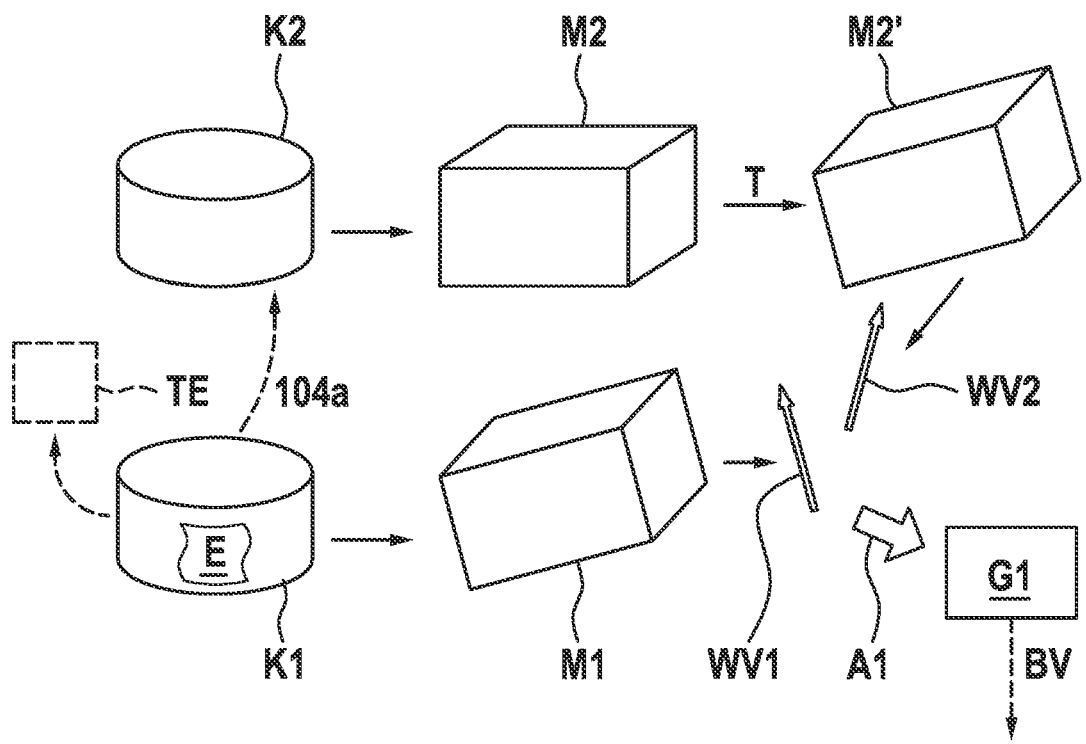
FIG. 2 schematically shows a simplified block diagram according to further preferred specific embodiments of the present invention.

In further preferred specific embodiments, it is provided that the method further includes (cf. FIGS. 1 and 2): introducing 104*a* a portion of first text collection K1 into second text collection K2 and/or vice versa. Introduction 104*a* of the portion of first text collection K1 into second text collection K2 and/or vice versa may take place, for example, after or during provision 104 (FIG. 1) of second text collection K2. In FIG. 2, the introduction is symbolized by dashed-line arrow 104*a* by way of example. In further preferred specific embodiments, introduction 104*a* is equivalent to mixing a portion of first text collection K1 with second text collection K2. In further preferred specific embodiments, introduction 104*a* or mixing may have the following effect: the more domain-specific the technical terms/terms are, the more limited is the context in which they occur (for example, the word "blanch" as a cooking method usually occurs together with "salt water," while "cookies" appears in baking recipes as well as in other contexts, for example with regard to Christmas). Thus, according to further preferred specific embodiments, when word vectors are formed on each text collection (for example, general language and domain-specific), the word vectors from very domain-specific terms may then be comparatively similar, since in the general language corpus (text collection) only the texts from the domain-specific corpus that are still very similar to one another occur. For the general language terms or ambiguous terms the contexts are more diverse, as a result of which according to further preferred specific embodiments, the vectors diverge more greatly from one another. The method according to preferred specific embodiments is thus more sensitive.

In further preferred specific embodiments, instead of ascertaining 106, 108 (FIG. 1) the two vector space models M1, M2, a vector space may be ascertained over both text collections (corpora) K1, K2 together, it being possible in particular to carry out the following steps: replacing beforehand the target words, for which the shift in meaning is to be computed, by two different characters in the respective corpora, for example <word>_1 in the general language corpus and <word>_2 in the specific corpus.

In further preferred specific embodiments, instead of ascertaining 106, 108 (FIG. 1) the two vector space models M1, M2 in a window span of X neighboring words, the following may be carried out: for each set in the particular corpus, storing the neighboring words of the target words.

Further preferred specific embodiments relate to a use of the method according to the specific embodiments for ascertaining a shift in meaning BV of at least one element E of first text collection K1 from second text collection K2, representing the general language, for example, for a domain associated with first text collection K1, for example a technical terminology, in particular for ascertaining an intensity of the shift in meaning of the at least one element E of first text collection K1 from second text collection K2 for the domain associated with first text collection K1.

In further preferred specific embodiments, it is provided that the method further includes: ascertaining a bias vector, in particular for term extraction methods TE (FIG. 1), as a function of shift in meaning BV. This advantageously allows a precise initialization of the bias vector, it being possible to speed up the convergence of the algorithm.

In further preferred specific embodiments, it is provided that the method further includes: ascertaining an instantaneous page rank value as a function of shift in meaning BV, in particular as a function of the bias vector. In further preferred specific embodiments, stated bias vector vi may be ascertained as follows, for example: $v_i = 1 - x_i$, if $x_i$ is the shift in meaning associated with a word $w_i$ ("meaning shift value"); otherwise, $v_i = 0$.

One option for also finding terminology for a certain field in a heterogeneous text data collection is to use the Personalized PageRank algorithm. The nodes in the graph are represented by the words in the text, and the edges are represented by their joint occurrence within a window or their word vector similarity, etc. (Milhacea and Tarau, 2004; De Groc et al., 2011; Khan et al., 2016, Zhang et al., 2017, among others). The PageRank algorithm may be formalized as follows:

$$PR' = d * A * PR + (1-d) * v,$$

where PR is a vector having absolute value IVI, in which each value is associated with a word, PR' is the instantaneous page rank and PR is the page rank from the preceding step, d is an attenuation factor, A is the transition matrix, and v is the above-mentioned bias vector, which for each node (each word) contains a value that determines how greatly the computation is to be influenced in the direction of a node.

Consequently, for the term extraction it may be useful according to further preferred specific embodiments to influence the computation in the direction of several seed terms: $v_i = 1$ when word $w_i$ in question is contained in the set of seed words; otherwise, $v_i = 0$.

Figure 7:
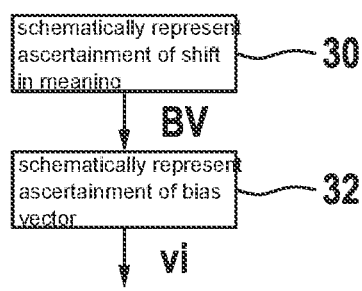
FIG. 7 schematically shows a simplified flowchart of a method according to further preferred specific embodiments of the present invention.

In further preferred specific embodiments of the present invention, stated bias vector vi may be ascertained as a function of shift in meaning BV that is ascertained according to preferred specific embodiments, which allows an accurate computation of the bias values and speeds up the convergence of the algorithm. This means that the conventional page rank algorithm may be improved according to preferred specific embodiments. This is schematically depicted in FIG. 7. Step 30 schematically represents the ascertainment of shift in meaning BV, for example with the aid of the method according to preferred specific embodiments, described above by way of example with reference to FIGS. 1, 2. Step 32 from FIG. 7 schematically represents the ascertainment of bias vector vi as a function of shift in meaning BV previously ascertained in step 30.

Preferred specific embodiments are usable for an automatic terminology extraction (ATE), for example, which involves the automatic finding of words or word groups that characterize a certain technical field. Terminology extraction finds application, among other areas, in lexicon, thesaurus, and ontology development, information search in databases, in text classification, and in text clustering.

With the aid of bias vector vi, which is ascertained or initialized according to preferred specific embodiments, for example term extraction methods TE (FIG. 1) may be speeded up, which saves computing capacity, for example. In addition, errors in the extraction may be avoided, for example when the system takes an incorrect path. Furthermore, the following applications are improved: —subject indexing: less unambiguous keywords may be assigned; —quicker automatic development of glossaries and ontologies.

The principle according to the specific embodiments may improve the area of terminology extraction, and thus related areas such as subject indexing (keyword extraction). By use of preferred specific embodiments, for example domain-specific technical terms may be found more quickly, in particular in heterogeneous text sets.

The principle according to the specific embodiments may also improve algorithms other than the Personalized PageRank algorithm mentioned above as an example. For this purpose, it is useful that the improved method utilizes a bias vector according to the specific embodiments, for example for influencing the transition probabilities, so that the improved method may converge more quickly. As a result of applying the principle according to the specific embodiments, predominantly, in particular only, clear (unambiguous) terms are found and utilized as seed. As a result, the method is not diverted into a wrong direction by an ambiguous word.

Further preferred specific embodiments relate to a device 200 (cf. FIG. 3) for analyzing elements of a first text collection, device 200 being designed to carry out the method according to the specific embodiments (cf. the flowchart from FIG. 1, for example).

Figure 3:
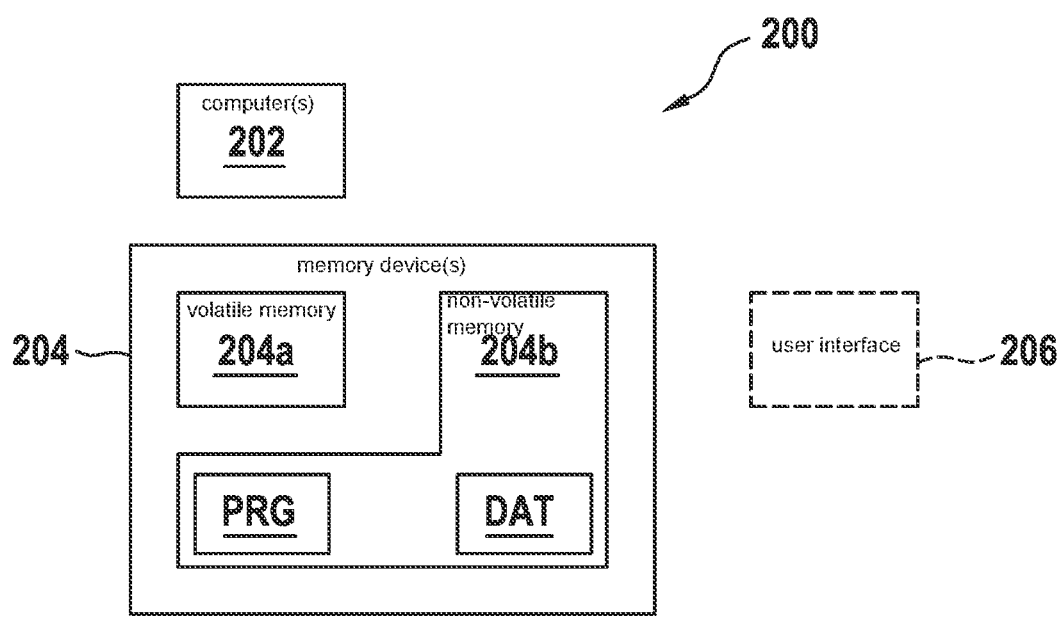
FIG. 3 schematically shows a simplified block diagram of a device according to further preferred specific embodiments of the present invention.

FIG. 3 schematically shows a simplified block diagram of device 200 according to further preferred specific embodiments. Device 200 includes at least one computer 202, at least one memory device 204, associated with computer 202, for at least temporarily storing a computer program PRG, computer program PRG being designed in particular to control an operation of device 200, in particular for carrying out the method according to preferred specific embodiments.

In further preferred specific embodiments, computer 202 includes at least one of the following elements: a microprocessor, a microcontroller, a digital signal processor (DSP), a programmable logic module (a field programmable gate array (FPGA), for example), an application-specific integrated circuit (ASIC), and a hardware circuit. Combinations thereof are also possible in further preferred specific embodiments, as well as a distributed arrangement of at least some components, for example on various elements of a computer network.

In further preferred specific embodiments, memory device 204 includes at least one of the following elements: a volatile memory 204a, in particular a working memory (RAM), and a nonvolatile memory 204b, in particular a flash EEPROM. Computer program PRG is preferably stored in nonvolatile memory 204b. In further preferred specific embodiments, data DAT that are usable for carrying out the method according to the specific embodiments are also at least temporarily storable in memory device 204. Data DAT may include at least one of the following elements, for example: first text collection K1 or portions of first text collection K1, second text collection K2 or portions of second text collection K2, data characterizing first vector space model M1 and/or second vector space model M2 and/or modified second vector space model M2', data characterizing the mapping of the second vector space onto the first vector space, in particular in the form of a transformation matrix T, data characterizing one or multiple word vectors WV1 of the first vector space and/or of second vector space WV2, first variable G, and/or shifts in meaning BV ascertained according to further preferred specific embodiments, in particular in the form of numerical values.

Figure 4:
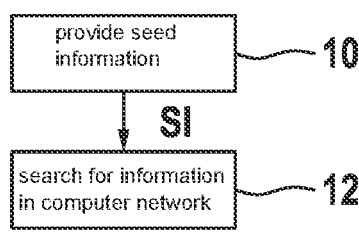
FIG. 4 schematically shows a simplified flowchart of a method according to further preferred specific embodiments of the present invention.

Further preferred specific embodiments relate to a method (cf. FIG. 4) for searching for information in a set of digital data, in particular in a computer and/or computer network, including the following steps: providing 10 seed information that characterizes one or multiple starting points in the set of digital data, in particular in the computer network, for the search of the information, searching 12 for information in the computer network as a function of seed information SI, a method according to the specific embodiments being used for providing seed information SI, for example the sequence according to FIG. 1 described above by way of example. In this way, particularly meaningful seed information SI, for example that is specific or unambiguous for a certain domain, may be predefined which enhances the efficiency of search 12 (FIG. 4). It is thus possible, using the same computer resources, to search for or evaluate a fairly large set of digital data, and crawling may be carried out for theme-relevant data, in particular text data, using less computing time than with conventional approaches. In particular, in further preferred specific embodiments the above-described search method may be used for implementing efficient focus crawlers.

In further preferred specific embodiments, seed information SI may be, for example, Internet addresses (URLs) and/or search words for use with at least one search engine and/or database.

In further preferred specific embodiments, it is provided that provision 10 of seed information SI includes (cf. FIG. 5): predefining 10a a first number of terms for the search (for example, by a user via a user interface 206 (FIG. 3) and/or automatedly, as a function of configuration data, for example, which, for example, are likewise storable, at least temporarily, in memory device 204), ascertaining 10b (FIG. 5) a shift in meaning BV of the first number of terms for the search as a function of first variable G1 (FIG. 2), using 10c (FIG. 5) those terms of the first number of terms whose shift in meaning BV falls below a predefinable first threshold value as seed information SI for search 12 (FIG. 4). It is thus advantageously ensured that particularly specific terms are used for seed information SI.

For example, in further preferred specific embodiments a sequence according to FIG. 1 may be carried out for each term of the first number of terms in order to ascertain a particular shift in meaning BV of this term E. Such terms whose shift in meaning BV falls below the predefinable threshold value may be regarded, for example, as sufficiently specific for a planned search 12, it being possible to carry out the search using these sufficiently specific terms. For the further terms of the first number of terms, for example no search is carried out, since they are regarded as insufficiently specific.

Figure 5:
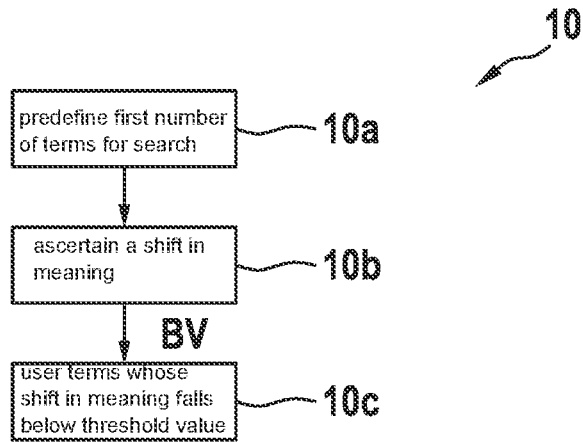
FIG. 5 schematically shows a simplified flowchart of a method according to further preferred specific embodiments of the present invention.

In further preferred specific embodiments, device 200 according to FIG. 3, in particular with control by computer program PRG, is (also) designed to carry out the method according to FIGS. 4, 5.

Further preferred specific embodiments relate to a method (cf. FIG. 6) for searching for information in a set of digital data, in particular in a computer network or a database, including the following steps: receiving 20 a search term Q (for example, via a user interface 206, FIG. 3), assessing 22 search term Q as a function of a shift in meaning of the search term with respect to second text collection K2, ascertained with the aid of the method according to the specific embodiments (for example, using the sequence according to FIG. 1 or portions thereof), and as a function of assessment 22, carrying out 24 the search using the search term or rejecting 26 the search term. It is thus advantageously possible to carry out searches in a targeted manner when sufficiently accurate or specific search terms, in particular with regard to a certain domain, are used, whereas search operations for less specific search terms may be avoided, which saves computer resources and energy.

Figure 6:
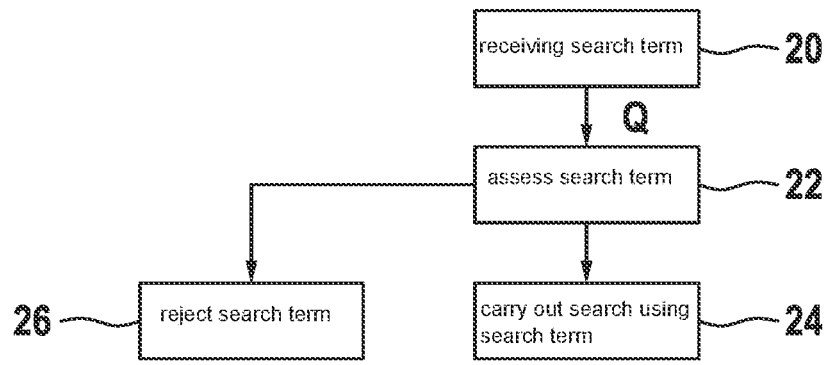
FIG. 6 schematically shows a simplified flowchart of a method according to further preferred specific embodiments of the present invention.

In further preferred specific embodiments, device 200 according to FIG. 3, in particular with control by computer program PRG, is (also) designed to carry out the method according to FIG. 6.

Further advantageous aspects and specific embodiments are described below, which are combinable, alone or in combination with one another, with the specific embodiments described above by way of example.

In further preferred specific embodiments, with the aid of a numerical assessment of the extent of the change in meaning, for example using first variable G1 (FIG. 2), for a potential term with regard to a technical terminology new applications may be addressed and old applications may be improved, for example: —subject indexing: assigning more unambiguous keywords, —automatically developing glossaries, —assistance from the learning system when learning the usage of a technical terminology (by laypersons, for example), —better classification of terms in a terminology (via the degree of belonging to a technical terminology, centrality), —better classification of the degree of difficulty of terms of a terminology (specificity), —focus crawling: better seed words may be selected (seed words without change in meaning with regard to general language) which more unambiguously define the technical field.

In further preferred specific embodiments, the problem of how to classify ambiguous terms in a terminology compared to strictly general language terms, i.e., elements of second text collection K2, may be solved. This is particularly advantageous, since conventional methods thus far have not been able to deal with ambiguity.

Characterization of a terminology, made possible in further preferred specific embodiments, may advantageously also be useful for subsequent applications, for example when laypersons are learning a technical terminology. Laypersons may possibly not recognize changes in meaning of terms in the technical terminology that are already known, for which reason a learning system should address this in particular.

Further preferred specific embodiments also allow improvement of a terminology extraction, and thus of related areas such as subject indexing (keyword extraction). The related art thus far in particular has not included detection of the intensity of shift in meaning BV of a term E from the general language into technical terminology. According to further preferred specific embodiments, the degree of shift in meaning BV is numerically determined, for example starting from a number of x meanings in the general language (text collection K2), to a number of y meanings in technical terminology (text collection K1).

Further preferred specific embodiments also allow in particular a frequency distribution of the meanings within a language to be taken into account.

Further preferred specific embodiments allow the recognition that a term E has a subject-specific meaning. Further preferred specific embodiments also allow the recognition of whether a conflict in understanding the term possibly exists over all meanings of term E and the frequency of usage. According to further preferred specific embodiments, measure BV [sic] thus also reflects a certain expectation that, for example, a layperson has for the usage of a term E in technical terminology. For example, for a term E that is already ambiguous in general language K2, a layperson is likely to expect that a shift in meaning BV (in particular with a nonzero value of, for example, the vector distance between word vectors WV1, WV2 in question) occurs the same as with a previously unambiguous term. If the difference between the meanings in the general language and technical terminology is not too great, it is more likely that the layperson does not immediately recognize the shift in meaning.

Further preferred specific embodiments relate to an application of the method according to the specific embodiments (cf. the example sequence according to FIG. 1, for example) in the areas of assistance, text classification (classification of texts in collections; belonging to a domain, relevance for user groups, for example technical experts or laypersons), digital dictionaries and thesauruses.

What is claimed is:

1. A method for analyzing elements of a first text collection, comprising the following steps:
providing the first text collection;
providing a second text collection that is different from the first text collection;
ascertaining a first vector space model that characterizes a first vector space associated with the first text collection;
ascertaining a second vector space model that characterizes a second vector space associated with the second text collection;
ascertaining a modified second vector space model as a function of a mapping of the second vector space onto the first vector space; and
analyzing at least one element of the first text collection as a function of a first word vector of the first vector space model corresponding to the at least one element, and as a function of a second word vector of the modified second vector space model corresponding to the at least one element.

2. The method as recited in claim 1, wherein the analysis includes ascertaining a first variable that characterizes a vector distance between the first word vector and the second word vector, the first variable representing a shift in meaning of the at least one element from the second text collection, to a domain associated with the first text collection.

3. The method as recited in claim 2, wherein the second text collection represents a general language, and the domain associated with the first text collection is technical terminology.

4. The method as recited in claim 1, wherein the analysis includes formation of a cosine distance or a Euclidian distance between the first word vector and the second word vector.

5. The method as recited in claim 1, wherein: (i) the first text collection is a theme-specific and/or subject-specific text collection, and/or (ii) the second text collection is a non-theme-specific and/or non-subject-specific text collection.

6. The method as recited in claim 1, wherein the provision of the first text collection and/or the provision of the second text collection includes: a) collecting texts and/or words in a computer or computer network with the aid of crawling of websites, and/or b) collecting texts and/or words from digital or digitized books.

7. The method as recited in claim 1, wherein word vectors of elements of the text collections that occur in only one of the first and second text collections are discarded.

8. The method as recited in claim 1, wherein the at least one element of the first text collection is ascertained using a term extraction method.

9. The method as recited in claim 1, further comprising:
introducing a portion of the first text collection into the second text collection and/or introducing a portion of the second text collection into the first text collection.

10. The method as recited in claim 1, wherein the method is used for ascertaining a shift in meaning of the at least one element of the first text collection from the second text collection, to a domain associated with the first text collection, the ascertaining of the shift in meaning including ascertaining an intensity of the shift in meaning of the at least one element of the first text collection from the second text collection to the domain associated with the first text collection, the method further comprising at least one of the following steps:
a) ascertaining a bias vector for term extraction methods, as a function of the shift in meaning;
b) ascertaining an instantaneous page rank value as a function of the shift in meaning as a function of the bias vector.

11. A device for analyzing elements of a first text collection, the device configured to:
provide the first text collection;
provide a second text collection that is different from the first text collection;
ascertain a first vector space model that characterizes a first vector space associated with the first text collection;
ascertain a second vector space model that characterizes a second vector space associated with the second text collection;
ascertain a modified second vector space model as a function of a mapping of the second vector space onto the first vector space;

analyze at least one element of the first text collection as a function of a first word vector of the first vector space model corresponding to the at least one element, and as a function of a second word vector of the modified second vector space model corresponding to the at least one element.

12. The device as recited in claim 11, wherein the analysis includes ascertainment of a first variable that characterizes a vector distance between the first word vector and the second word vector, the first variable representing a shift in meaning of the at least one element from the second text collection, to a domain associated with the first text collection.

13. A method for searching for information in a set of digital data in a computer network, comprising the following steps:
   providing seed information that characterizes one or multiple starting points in the set of digital data in the computer network, for the search of the information;
   searching for the information in the computer network as a function of the seed information;
   wherein the providing of the seed information includes:
      providing a first text collection;
      providing a second text collection that is different from the first text collection;
      ascertaining a first vector space model that characterizes a first vector space associated with the first text collection;
      ascertaining a second vector space model that characterizes a second vector space associated with the second text collection;
      ascertaining a modified second vector space model as a function of a mapping of the second vector space onto the first vector space; and
      analyzing at least one element of the first text collection as a function of a first word vector of the first vector space model corresponding to the at least one element, and as a function of a second word vector of the modified second vector space model corresponding to the at least one element.

14. The method as recited in claim 13, wherein the analysis of the at least one element includes ascertaining a first variable that characterizes a vector distance between the first word vector and the second word vector, the first variable representing a shift in meaning of the at least one element from the second text collection, to a domain associated with the first text collection, and wherein the providing of the seed includes:
   predefining a first number of terms for the search;
   ascertaining shifts in meaning of the first number of terms for the search as a function of the first variable;
   using those terms of the first number of terms whose shift in meaning falls below a predefinable first threshold value as seed information for the search.

15. A method for searching for information in a set of digital data in a computer and/or computer network or a database, comprising the following steps:
   receiving a search term;
   assessing the search term as a function of a shift in meaning of the search term with respect to a second text collection; and
   as a function of the assessment, carrying out the search using the search term or rejecting the search term;
   wherein the shift in meaning is determined by:
      providing a first text collection;
      providing the second text collection that is different from the first text collection;
      ascertaining a first vector space model that characterizes a first vector space associated with the first text collection;
      ascertaining a second vector space model that characterizes a second vector space associated with the second text collection;
      ascertaining a modified second vector space model as a function of a mapping of the second vector space onto the first vector space; and
      analyzing the search term as a function of a first word vector of the first vector space model corresponding to the search term, and as a function of a second word vector of the modified second vector space model corresponding to the search term;
   wherein the analysis includes ascertainment of a first variable that characterizes a vector distance between the first word vector and the second word vector, the first variable representing the shift in meaning of the search term from the second text collection, to a domain associated with the first text collection.

* * * * *